United States Patent [19]

Berzack

[11] Patent Number: 5,029,774

[45] Date of Patent: Jul. 9, 1991

[54] GLIDER

[76] Inventor: Jeffrey A. Berzack, 200 South St., Rochester, Mich. 48063

[21] Appl. No.: 454,285

[22] Filed: Dec. 21, 1989

[51] Int. Cl.[5] .................. B64C 31/02; B64C 31/08
[52] U.S. Cl. ........................... 244/16; 244/13; 244/153 R; 446/79
[58] Field of Search .............. 244/13, 16, 153 R, 900, 244/34 A; 446/61, 488; 248/99, 101; 73/188

[56] References Cited

U.S. PATENT DOCUMENTS

| 3,893,649 | 7/1975 | Cornell et al. | 248/99 |
| 4,246,721 | 1/1981 | Bowers | 446/61 |
| 4,280,673 | 7/1981 | Brzack | 244/13 |
| 4,345,401 | 8/1982 | Brzack | 244/13 |
| 4,411,300 | 10/1983 | Rico | 248/99 |
| 4,624,648 | 11/1986 | Waters | 244/153 A |

Primary Examiner—Joseph F. Peters, Jr.
Assistant Examiner—Linda L. Palomar
Attorney, Agent, or Firm—Basile and Hanlon

[57] ABSTRACT

A glider, comprising a tubular body open at each end and having a leading edge and a trailing edge, has a two-ring frame assembly disposed about the perimeter of the leading edge to provide body shape and rigidity. A two-ring frame assembly comprises a base ring and a clamping ring configured to matingly engage the base ring. The base ring is placed about the inner perimeter of the leading edge of the tubular body and the clamping ring is placeable about the outer perimeter of the leading edge of the tubular body to retain the tubular body between the base and the clamping ring when the rings are matingly engaged.

17 Claims, 5 Drawing Sheets

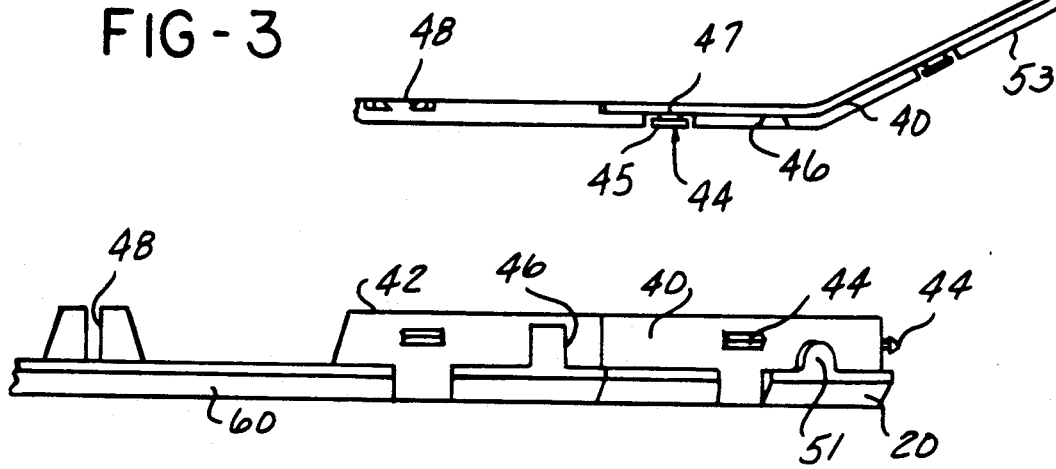
FIG-3
FIG-4
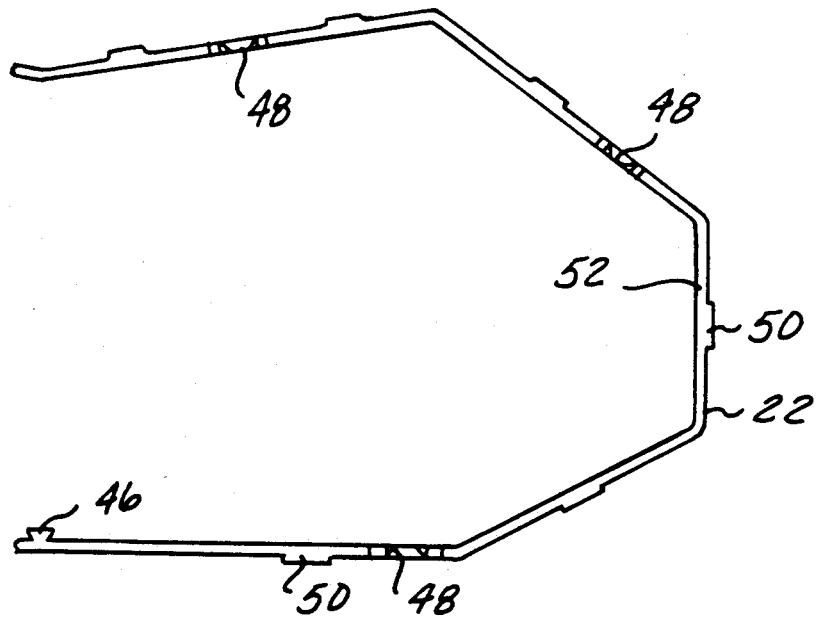
FIG-5
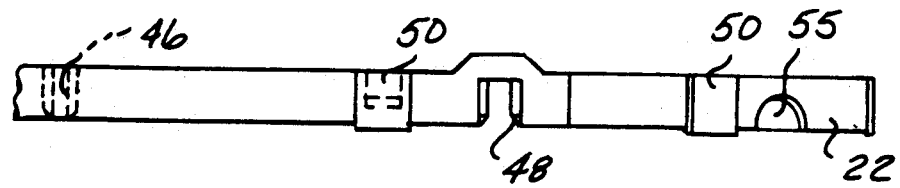
FIG-6

GLIDER

BACKGROUND OF THE INVENTION

1. Field of the Invention

The present invention is directed to a glider having a tubular configuration, open at each end, constructed of a lightweight sheet material and having a semi-rigid frame assembly disposed about the perimeter of the glider to provide body shape and optimum center of mass.

2. Description of the Prior Art

Prior art gliders of the type disclosed in the present invention are shown in the inventor's prior patents, U.S. Pat. No. 4,280,673 and U.S. Pat. No. 4,345,401. The '673 patent discloses a glider which is formed from a multi-sided tube, open at each end, and having body lifting surfaces including a top wall, opposed upper side walls, vertical side walls, a pair of opposed lower side walls, and bottom walls. The walls are configured as shown in the figures, with cut-outs in the top portion to provide lift and aerodynamic stability. Additionally, a frame near the leading edge is shown which gives the glider rigidity. The '401 patent additionally discloses a reconfigured body with a convex, downward curvature in the lower panels which assists in providing lift to the glider thereby improving flight characteristics.

Several shortcomings in the prior art are the lack of a rigid frame that is easy to attach to the tubular body, and one which remains in place during flight and impact. Additionally, the design of the prior art patents, although having some degree of body form for added lift, did not have a body which provided optimum flight characteristics.

The present invention is directed to an improved glider which addresses the problems of the gliders described above.

SUMMARY OF THE INVENTION

In accordance with the present invention, a glider is disclosed which comprises a multi-sided tubular body, open at each end, having a leading edge at a forward end and a trailing edge at a rearward end with a plurality of walls joined together to define an integral member. The walls, of a generally planar configuration, comprise top walls separated by a space, opposed upper side walls, opposed vertical side walls, opposed lower side walls, and bottom walls which extend between the lower side walls to meet at a center position.

The top walls, the opposed lower side walls and the bottom walls have a curvature generally convex downward, which extends in the axial direction, beginning with a gradual curvature at the leading edge and decreasing in radii as it continues toward the trailing edge. In a transverse section, the curvature is uniform. This curvature profile, which is contrary to generally accepted wing designs, has been found to provide greatly increased glider stability and an increase in flight characteristics, such as lift/drag and glide ratios.

The body surfaces comprise panels of various lengths which have been found to greatly enhance flight characteristics. An upper cut-out portion, which extends from the leading to the trailing edge of the top wall, divides the top wall into two upper wall portions separated by a space. The cut-out portion extends symmetrically rearwardly and outwardly across the opposed upper side walls to terminate at a position on the trailing edge of the vertical panels. A frame portion traverses the space between the two upper wall portions thereby retaining the integrity of the multi-sided tube.

To retain body shape during flight and impact, and to provide for a secure assembly without the application of adhesives, a two-ring frame assembly is provided. The frame assembly is disposed about the perimeter of the leading edge of the tubular body. The frame assembly comprises a base ring which is placed about the inner perimeter of the leading edge of the tubular body, and a clamping ring, configured to matingly engage the base ring, which is placed about the outer perimeter of the leading edge of the tubular body. The two rings act to retain the tubular body therebetween when the rings are matingly engaged.

Tubular body attaching means primarily consist of positive engagement projections extending outwardly from the base ring that are designed to pass through retaining slits in the body surface, and are configured so as not to allow the body to come back off the projections. The projections are used to positively retain the body in engagement with the base ring, so as to maintain the integrity of the structure upon engagement and locking of the clamping ring. Ring attaching means for holding the base ring and clamping ring securely together with the body clamped therebetween may consist of I-beam and dove-tail configurations for tight interlock therebetween. The positive engagement projections used to retain the body may also act as ring attaching means by engaging recesses or pockets in the clamping ring, thereby locking the clamping ring to the base ring. An adhesive applied to the body contact surface of the base ring may also be used to enhance the strength of the assembly. Ring attaching means may also comprise mushroom projections on the base ring and horseshoe snap slots in corresponding areas on the clamp ring.

The two-ring frame assembly, when in a clamped position, presents aerodynamically efficient surfaces since the joining surfaces and clamps are formed to be flush when in a clamped position. The two-ring frame assembly is weighted toward the bottom thereby increasing axial rotational stability by moving the glider center of mass downward. The frame assembly is constructed of a semi-rigid polymer thereby providing a leading edge framework for securely retaining glider form during flight and for providing flexibility against shock due to collision and landing. Additionally, attaching means formed on the exterior surfaces of the ring assembly, or detachable clips, may be used to engage other ring assemblies thereby allowing for multiple gliders to be flown in adjacent attachment.

Other objects and features of the invention will become apparent by reference to the following description of the preferred embodiment and to the drawings.

BRIEF DESCRIPTION OF THE DRAWINGS

FIG. 3 is a partial inverted rear view of the base ring of the present invention;

FIG. 4 is a partial top view of the base ring of FIG. 3;

FIG. 5 is an inverted front view of the clamping ring of the present invention;

FIG. 6 is a top view of the clamping ring of FIG. 5;

DESCRIPTION OF THE PREFERRED EMBODIMENT

Figure 1:
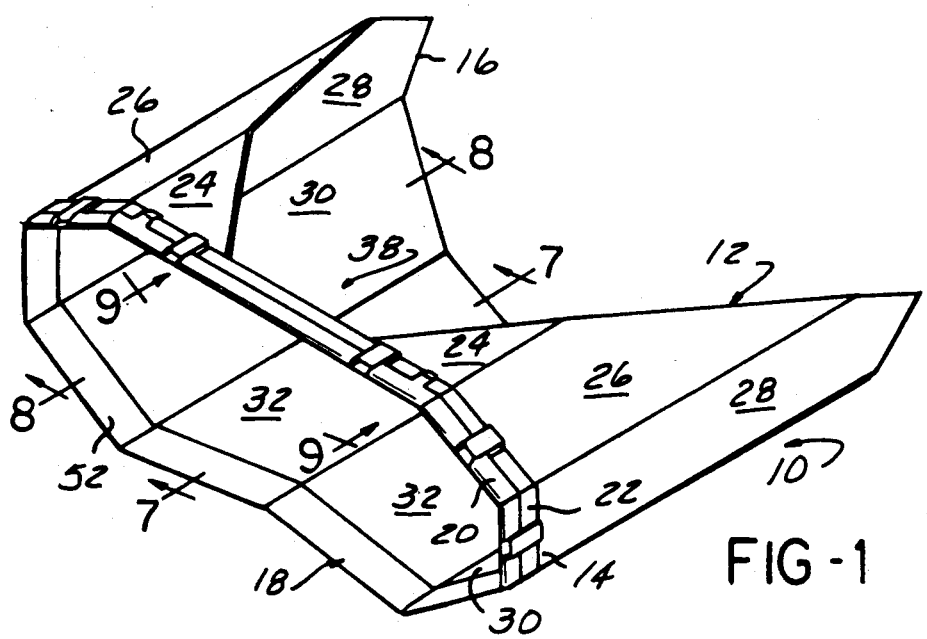
FIG. 1 is a perspective view of the glider of the present invention.
Figure 2:
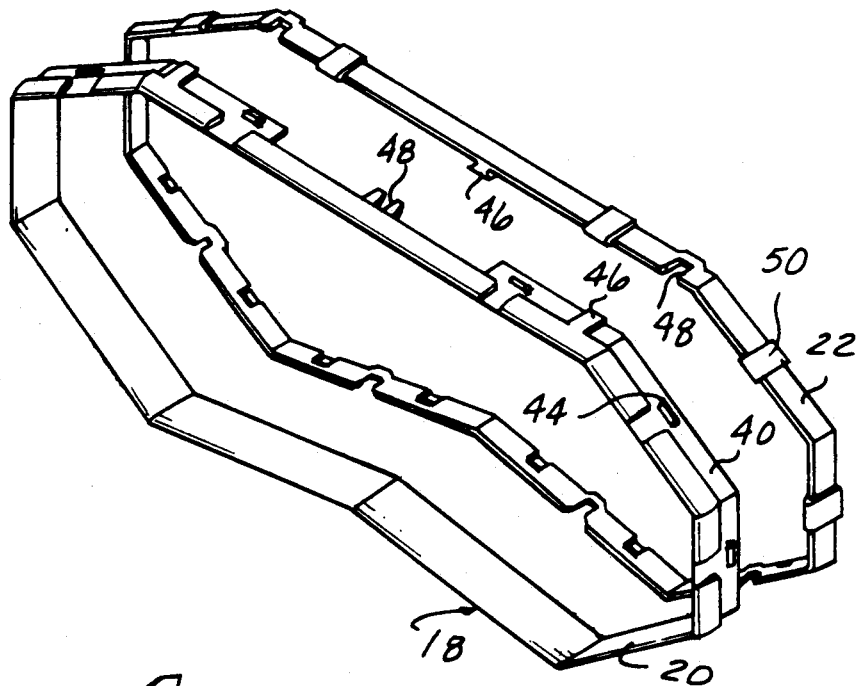
FIG. 2 is a perspective view of the two-ring frame assembly of the present invention in a disassembled configuration.

In FIG. 1 there is shown a perspective view of a typical glider, designated generally as 10, of the present invention. The glider comprises a tubular body 12 having a leading edge 14 and a trailing edge 16 at forward and rearward ends. A two-ring frame assembly 18 is disposed about the perimeter of leading edge 14 to provide tubular body 12 with shape and rigidity. The two-ring frame assembly 18 comprises base ring 20 and a clamping ring 22 which is configured to matingly engage the base ring 20.

Figure 10:
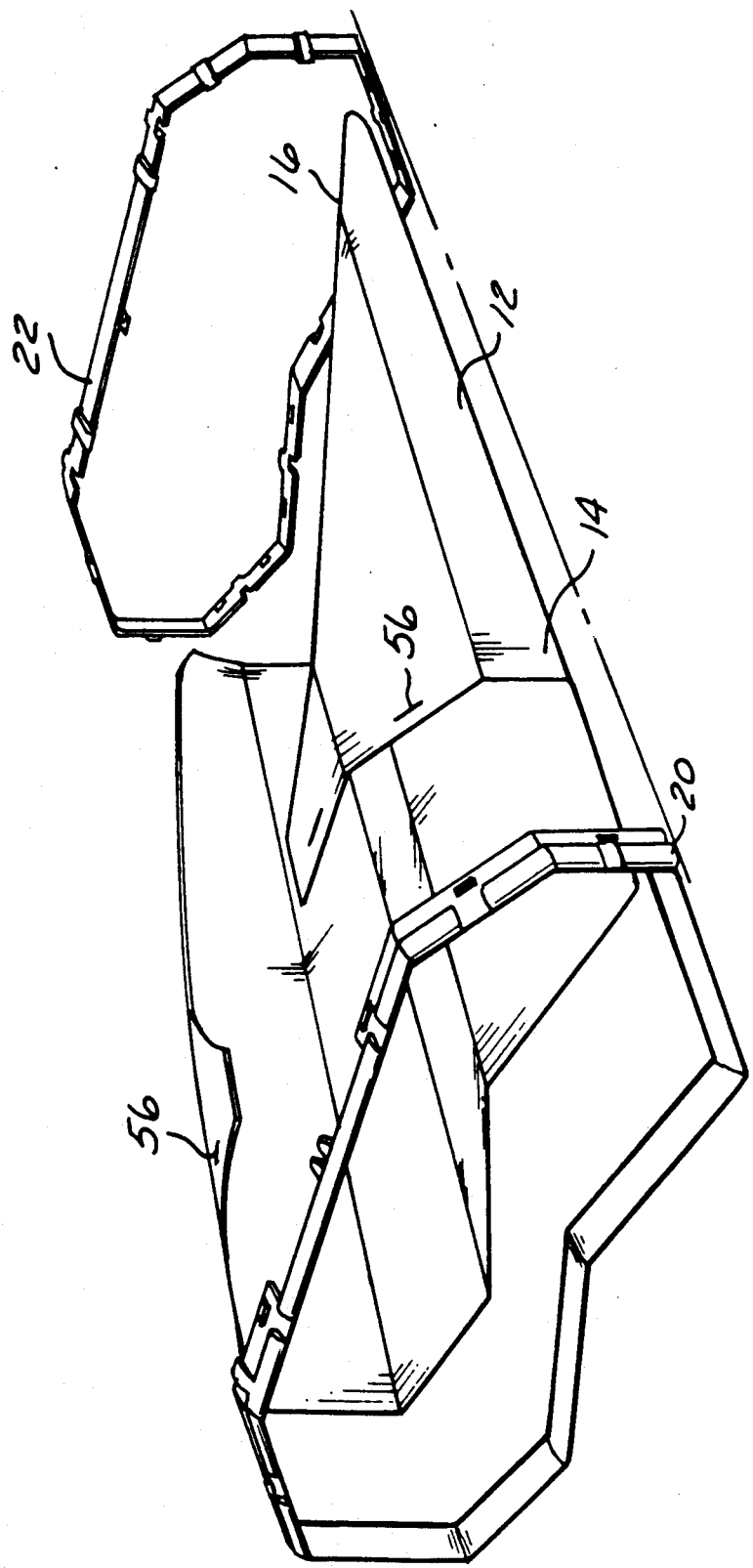
FIG. 10 is an exploded perspective view of the glider of the present invention showing the relationship of the body and ring assembly.

The tubular body 12 is placed about the outer perimeter of base ring 20, as shown in FIG. 10. Clamping ring 22 is then placeable about the outer perimeter of leading edge 14 of tubular body 12 thereby retaining the tubular body between the base ring 20 and clamping ring 22 when the rings are matingly engaged as shown in FIG. 1.

As shown in FIG. 1, tubular body 12 comprises a plurality of walls which are joined together with two-ring frame assembly 18 to define an integral member. The wall portions which are of a generally planar configuration, comprise top walls 24, opposed upper side walls 26 integral with the top walls 24, and extending downwardly and outwardly a predetermined distance, opposed vertical side walls 28 integral with the upper side walls 26, opposed lower side walls 30 integral with the vertical side walls 28, and extending downwardly and inwardly a predetermined distance, and bottom walls 32 extending between, and integral with, lower side walls 30 to meet at a center position. The lower walls 32 may extend slightly upwardly to meet at the center position thereby forming a ridge.

Figure 7:
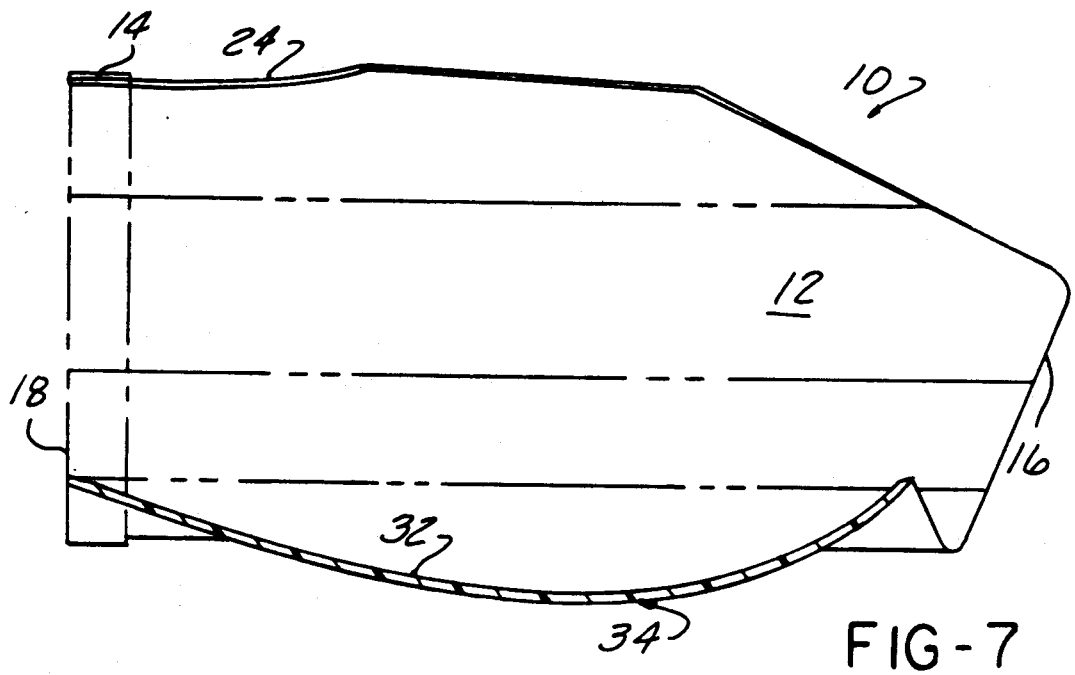
FIG. 7 is a schematic sectional view taken along line 7—7 of FIG. 1.

Various wall portions of glider 10 are formed with curvatures designed to provide an increase in the aerodynamic performance of the glider during flight. In FIG. 7, the curvature of the top and bottom walls is shown to have a generally convex curvature, facing downward, extending in the axial direction. Top wall 24 maintains a relatively flat configuration to about its midway point where it begins a more pronounced upward curvature terminating in a steeper lip portion at the trailing edge 16 relative to the curvature at the leading edge 14, and relative to the curvature of the overall surface. Bottom wall 32 also extends in a generally convex, facing downward curvature beginning with a gradual curvature near the leading edge 14 and continuing rearward with decreasing radii uniformly to a lowermost portion 34 of the curvature between the axially central portion of the glider and the trailing edge 16. Near the trailing edge 16, the curvature continues in an upwardly curved portion providing a steep lip portion.

Figure 8:
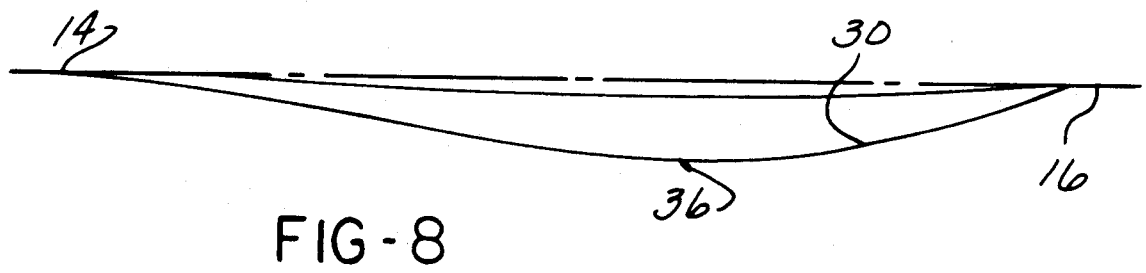
FIG. 8 is a schematic diagram of the curvature of a panel of the glider taken along line 8—8 of FIG. 1.

The diagram of FIG. 8 shows the curvature of the opposed lower side walls to have a generally convex curvature facing downward, extending in the axial direction, beginning with a gradual curvature at the leading edge 14 and continuing uniformly to the lowermost portion 36 of the curvature at an axially central portion of the walls, at which point the curvature reverses in an upward direction. This curvature extends outwardly to the trailing edge 16.

Figure 15:
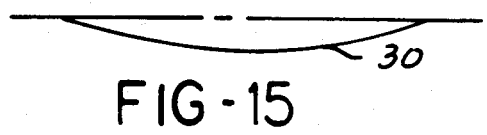
FIGS. 15-20 are schematic diagrams of the curvature of a panel of the glider taken along line 8—8 of FIG. 1.
Figure 16:
Figure 17:
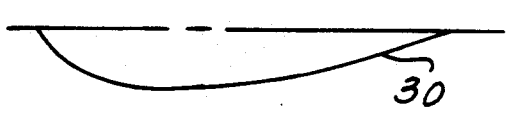
Figure 18:
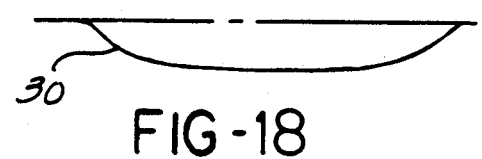
Figure 19:
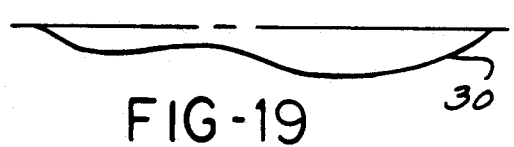
Figure 20:
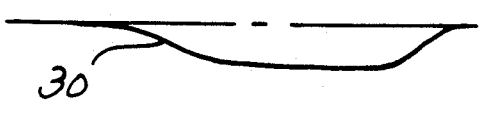

Other examples of wing profile curvature taken along line 8—8 of FIG. 1 are shown in FIGS. 15-20. FIG. 15 shows a uniform regular curvature. FIG. 16 is a decreasing radii regular curvature. FIG. 17 is an increasing radii regular curvature, while FIG. 18 is an irregular curvature. FIGS. 19 and 20 show irregular compound and irregular combination curvatures, respectively. Any combination of surface shape will work, and FIGS. 15-20 are examples of different profiles for different uses. Varied combinations will improve specifically related flight performance.

Figure 9:
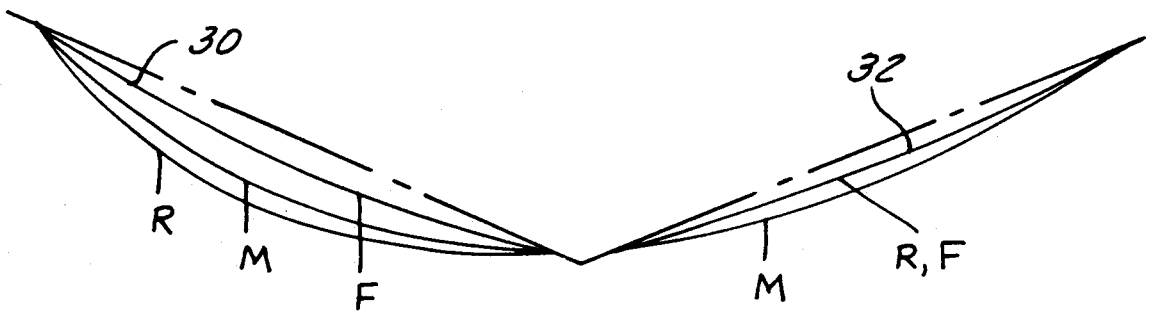
FIG. 9 is a schematic diagram showing the progressive curvature of the panels of the glider taken along line 9—9 of FIG. 1.

The diagram of FIG. 9, taken along line 9—9 of FIG. 1, shows a cross section of bottom wall 32 and opposed lower side wall 30. The diagram of FIG. 9 shows the axially progressive curvature of bottom wall 32 and opposed lower side wall 30 with F denoting the panel curvature at a position forward of the axially central portion of the walls, M denoting the curvature at the axially central point, and R denoting the panel curvature at a position rearward of the axially central portion M of the walls.

As shown in FIG. 1, the tubular body 12 comprises an upper cut-out portion which extends from the leading edge 14 to trailing edge 16 of the top wall 24. The cut-out portion divides the top walls 24 into two upper wall portions divided by a space 038, and extends symmetrically rearwardly and outwardly across the opposed upper side walls 26 to terminate at a position on the trailing edge of the vertical side walls 28. The two-ring frame assembly 18 traverses space 38 between the two upper portions 24 thereby retaining the integrity of the multi-sided tube.

As shown in FIGS. 3 and 4, base ring 20 comprises a mating surface 40, of a reduced perimeter, which extends about the exterior surface of base ring 20 adjacent to rearward edge 42. The reduction in perimeter of mating surface 40 corresponds to the thickness of clamping ring 22. As a result of the reduced perimeter of mating surface 40, two-ring frame assembly 18 has a flush outer surface, as seen in FIG. 1, when base ring 20 and clamping ring 22 are in an assembled configuration. Therefore, the thickness at surface 53, as shown in FIG. 3, is the same as the thickness of the leading edge 52 of clamping ring 22 as shown in FIG. 5.

Tubular body attaching means are disposed between the tubular body 12 and the exterior surface of base ring 20 to positively retain tubular body 12 in engagement therewith prior to and following fixed engagement with clamping ring 22. The attaching means may comprise an adhesive material applied to mating surface 40. In the preferred embodiment, the attaching means comprises projections 44 which extend outwardly from mating surface 40 of the base ring 20 to positively engage tubular body 12. The projections 44 may simply be forced through the tubular body material or may pass through apertures 56 formed in tubular body 12, and are of a configuration consisting of an overhang 45, as shown in FIG. 3, disposed about the outward perimeter atop the shaft portion 47 of the projection 44, so as not to allow the body to come back off projections 44 once engaged.

Additional attaching means, or fixing means, are disposed between base ring 20 and clamping ring 22 for retaining the two-ring frame assembly in mating engagement following glider assembly. The attaching means may comprise dove-tail projections having a male portion 46, as shown in FIGS. 5 and 6, disposed on one of the rings and a female receiving portion 48 disposed in a corresponding position on the other ring. The dove-tail assemblies (male portion 46 and female portion 48) engage in a sliding configuration when base ring 20 is attached to clamping ring 22. Projections 44 may also be used to positively retain clamping ring 22 in engagement with base ring 20. Receiving portions 50, having recesses formed therein, may be positioned on clamping ring 22 in positions corresponding to projections 44. During assembly, projections 44 engage receiving portions 50 to positively retain the rings in engagement, with the tubular body 12 disposed therebetween. Other retaining and positioning means may be used, such as stub locator 51 and notch 55.

Figure 12:
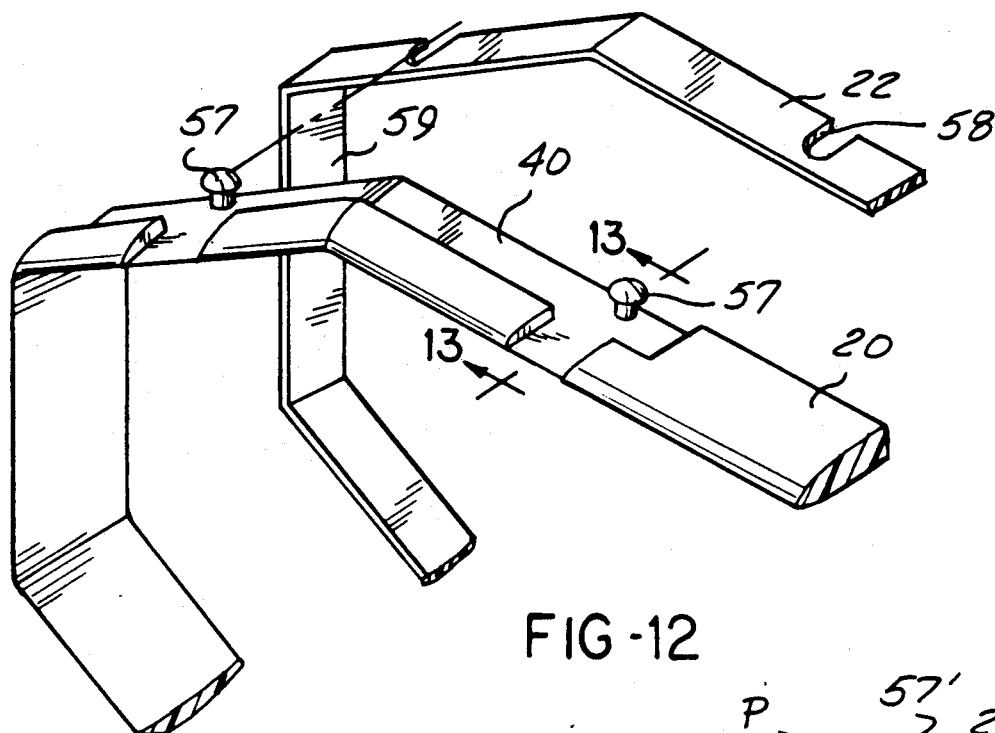
FIG. 12 is a perspective cut-away view of the base ring and clamp ring, disassembled, with the mushroom projection/horseshoe snap slot as the attaching means.
Figures 13, 14:
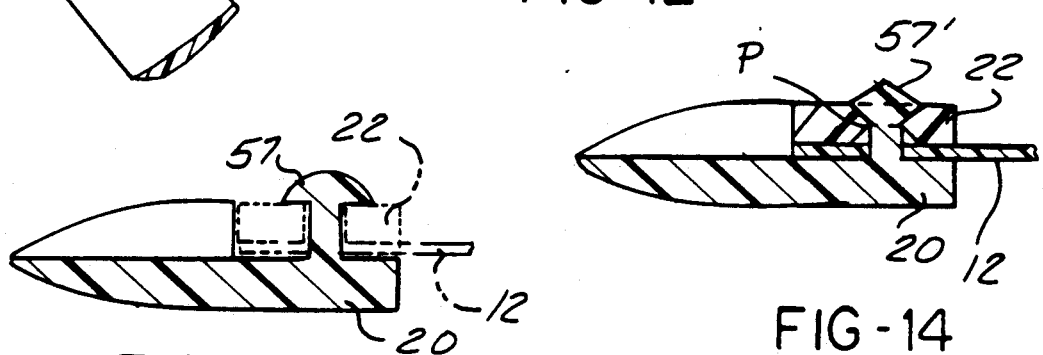
FIG. 13 is a cross-sectional view taken along line 13—13 of FIG. 12, showing the mushroom projection, with the body and clamp ring shown in phantom.
FIG. 14 is a cross-sectional view taken along line 13—13 of FIG. 12, showing an alternate configuration of the mushroom projection and clamp ring.

The attaching means may also comprise a mushroom shaped projection 57 on either base ring 20 or clamping ring 22. A horseshoe shaped slot 58 in a corresponding position on the other ring then snaps into place over mushroom projection 57, thereby securing tubular body 12 in between. A preferred embodiment is shown in FIG. 12 wherein mushroom projection 57 is located on base ring 20, with horseshoe slot 58 on clamp ring 22. FIG. 13 shows tubular body 12 and clamp ring 22 in phantom in place around mushroom projection 57. FIG. 14 shows an alternate configuration of the mushroom projection, designated 57'. With this alternate shape, the horseshoe slot 58 comes to point P, to fit the profile of mushroom projection 57'.

To insure a more secure grip on tubular body 12, small ridges (not shown) may be added to mating surfaces 40 and/or 39 (specify 12).

As an aid to increased stability during flight, base ring 20 is constructed with an aerodynamically efficient leading edge 60, which when combined with the smooth inner surface and flush outer surface of the two-ring frame assembly, greatly reduces drag and improves flight characteristics.

The two-ring frame assembly 18 is constructed of a semi-rigid polymeric material. The material provides a rigid leading edge frame for securely retaining the tubular body form during flight and for providing flexibility against shock experienced in a collision and during landing. The tubular body 12 is formed from a flexible spun-bonded polypropylene material, or other similar flexible material. The use of spun-bonded polypropylene provides the glider 10 with an extremely durable body 12 while retaining the lightweight characteristics desirable for efficient flight. The frame assembly 18 is weighted toward the bottom, thereby increasing axial rotational stability by moving the glider center of mass downward.

To assemble glider 10 from its various component parts, the tubular body 12 is first placed in engagement with base ring 20 by engaging tubular body attaching means 44 with the tubular body 12. The projections 44 may be forced through the tubular body material or may engage apertures 56 formed about the perimeter of leading edge 14 of tubular body 12, as shown in FIG. 10. As can best be seen in FIG. 10, once the body is fully seated about the entire perimeter of base ring 20, clamping ring 22 is passed slidingly over tubular body 12 from the trailing edge 16 towards leading edge 14 Clamping ring 22 is moved forward toward leading edge 14 until engaging portions, such as dovetail male portion 46, and projections 44, disposed on base ring 20, respectively engage corresponding receiving portions, such as slot 48 and receiving portion 50 Upon engagement, the tubular body 12 is firmly supported and retained between base ring 20 and clamping ring 22.

Figure 11:
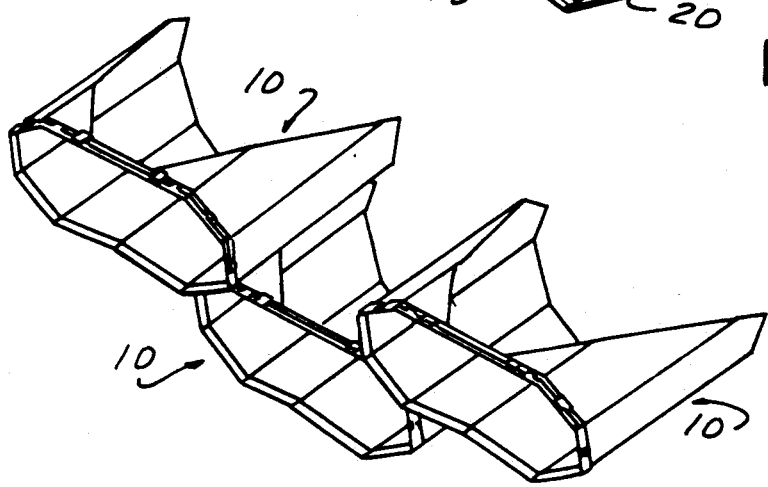
FIG. 11 is a perspective view of several gliders of the present invention attached together during flight.

FIG. 11 shows a configuration of three of the gliders 10 of the present invention locked in adjacent engagement. Retaining means, not shown, may be disposed about the exterior perimeter of the two-ring frame assembly 18, or be in the form of detachable clips to allow the gliders 10 to be attached together in adjacent relationship, as shown.

While certain embodiments of the invention have been described in detail above in relation to a glider, it will be apparent to those skilled in the art that the disclosed embodiment may be modified. Therefore, the foregoing description is to be considered exemplary rather than limiting, and the true scope of the invention is that defined in the following claims.

What is claimed is:

1. A glider, comprising:
   a tubular body, open at each end, having a leading edge and a trailing edge at forward and rearward ends respectively;
   a two-ring frame assembly disposed about the perimeter of said leading edge to provide body shape and rigidity, having a base ring and a clamping ring configured to matingly engage said base ring;
   said base ring placeable about the inner perimeter of said leading edge of said tubular body, and said clamping ring placeable about the outer perimeter of said leading edge of said tubular body, to retain said tubular body between said base and said clamping ring when said rings are matingly engaged; and
   tubular body attaching means, disposed between said tubular body and the exterior surface of said base ring to positively retain said tubular body in engagement therewith prior to mating of said clamping ring with said base ring.

2. A glider, as defined in claim 1, said attaching means comprising an adhesive material.

3. A glider, as defined in claim 1, said attaching means comprising projections, extending outwardly from said base ring to positively engage corresponding apertures formed in said tubular body.

4. A glider, as defined in claim 1, further comprising a mating surface, having a reduced perimeter, extending about the exterior surface of said base ring adjacent to the rearward edge thereof, said reduction in perimeter corresponding to the thickness of said clamping ring to provide a flush outer surface of said two-ring frame assembly.

5. A glider, as defined in claim 1, said base ring having an aerodynamically efficient inner surface.

6. A glider, as defined in claim 1, said frame assembly weighted toward a bottom portion thereof for increased rotational stability.

7. A glider, as defined in claim 1, said frame assembly constructed of a semi-rigid polymeric material.

8. A glider, as defined in claim 1, further comprising fixing means disposed between said base ring and said clamping ring for retaining said rings in said mating engagement.

9. A glider, comprising:
a tubular body, open at each end, having a leading edge and a trailing edge at forward and rearward ends respectively;
a two-ring frame assembly disposed about the perimeter of said leading edge to provide body shape and rigidity, having a base ring and a clamping ring configured to matingly engage said base ring;
said base ring placeable about the inner perimeter of said leading edge of said tubular body, and said clamping ring placeable about the outer perimeter of said leading edge of said tubular body, to retain said tubular body between said base and said clamping ring when said rings are matingly engaged; and
fixing means disposed between said base ring and said clamping ring for retaining said rings in said mating engagement, said fixing means comprising dove-tail projections disposed on one of said rings for sliding engagement with corresponding dove-tail slots on the other of said rings.

10. A glider, comprising:
a tubular body, open at each end, having a leading edge and a trailing edge at forward and rearward ends respectively;
a two-ring frame assembly disposed about the perimeter of said leading edge to provide body shape and rigidity, having a base ring and a clamping ring configured to matingly engage said base ring;
said base ring placeable about the inner perimeter of said leading edge of said tubular body, and said clamping ring placeable about the outer perimeter of said leading edge of said tubular body, to retain said tubular body between said base and said clamping ring when said rings are matingly engaged; and
fixing means disposed between said base ring and said clamping ring for retaining said rings in said mating engagement, said fixing means comprising mushroom shaped projections disposed on one of said rings for snap-on engagement with corresponding horseshoe shaped slots on the other of said rings.

11. A glider, comprising:
a tubular body, open at each end, having a leading edge and a trailing edge at forward and rearward ends respectively;
a two-ring frame assembly disposed about the perimeter of said leading edge to provide body shape and rigidity, having a base ring and a clamping ring configured to matingly engage said base ring;
said base ring placeable about the inner perimeter of said leading edge of said tubular body, and said clamping ring placeable about the outer perimeter of said leading edge of said tubular body, to retain said tubular body between said base and said clamping ring when said rings are matingly engaged; and
attaching means, disposed on the exterior of said frame assembly for engagement with corresponding attaching means on a second frame assembly of a second glider, said gliders attachable in adjacent configuration.

12. A glider comprising:
a tubular body, open at each end, having a leading edge and a trailing edge at forward and rearward ends respectively, and a plurality of walls, joined together to define an integral member, said plurality of walls further comprising top walls of a generally planar configuration, opposed upper side walls of a generally planar configuration, integral with said top walls, extending downwardly and outwardly a predetermined distance, opposed vertical side walls of a generally planar configuration, integral with said upper side walls, opposed lower side walls of a generally planar configuration, integral with said vertical side walls, extending downwardly and inwardly a predetermined distance and bottom walls of a generally planar configuration extending between and integral with said lower side walls to meet at a center position;
a two-ring frame assembly, disposed about the perimeter of said leading edge, having a base ring and a clamping ring configured to matingly engage said ring, said base ring placeable about the inner perimeter of said leading edge and said clamping ring placeable about the outer perimeter of said leading edge to retain said tubular body between said base ring and said clamping ring when said rings are matingly engaged;
said top walls having a curvature generally convex downward, extending in the axial direction, comprising a relatively flat configuration from said leading edge to a position midway of said wall and having a pronounced upward curvature, relative to said overall curvature, extending from a position axially rearwardly of said midway position to terminate in a steep upwardly projecting lip at said trailing edge; and
one of said bottom or lower walls having a generally convex, downward overall curvature, extending in the axial direction.

13. A glider, as defined in claim 12, wherein the curvature of the one of said bottom or lower walls comprises a gradual downward curvature extending uniformly rearwardly from said leading edge to a lowermost position between an axially central portion of said wall and said trailing edge and having a pronounced upward curvature, relative to said overall curvature, extending from said lowermost position axially rearwardly to terminate in a steep upwardly projecting lip at said trailing edge.

14. A glider, as defined in claim 13, wherein the other of said bottom or lower walls has a generally convex, downward overall curvature extending in the axial direction comprising a gradual downward curvature extending uniformly rearwardly from said leading edge to a lowermost position intermediate said leading edge, said leading edge having a gradual upward curvature extending uniformly rearwardly from said intermediate position to said trailing edge.

15. A glider, as defined in claim 13, further comprising attaching means, disposed on the exterior of said frame assembly for engagement with corresponding attaching means on the second frame assembly of a second glider;

said gliders attachable in adjacent configuration.

16. A method of assembling the glider defined in claim 13, comprising the steps of:
- attaching said leading edge of said tubular body to said mating surface of said base ring by positively engaging said attaching projections extending outwardly from said mating surface with said corresponding apertures formed along said leading edge;
- sliding said clamping ring axially along the exterior surface of said tubular body, from said trailing edge to said leading edge, to matingly engage fixing means disposed on said base ring with corresponding means disposed on said clamping ring to retain said rings in mating engagement with said leading edge of said tubular body clamped therebetween.

17. A glider comprising:
- a tubular body, open at each end, having a leading edge and a trailing edge at forward and rearward ends respectively;
- a two-ring frame assembly, constructed of a semi-rigid polymeric material, disposed about the perimeter of said leading edge to provide body shape and rigidity, having a base ring and a clamping ring configured to matingly engage said base ring, said base ring placeable about the inner perimeter of said leading edge of said tubular body and said clamping ring placeable about the outer perimeter of said leading edge of said tubular body to retain said tubular body between said base ring and said clamping ring when said rings are matingly engaged;
- said base ring further comprising a mating surface, having a reduced perimeter, extending about the exterior surface of said base ring adjacent to the rearward edge thereof, said reduction in perimeter corresponding to the thickness of said clamping ring to provide a flush outer surface of said two-ring frame assembly;
- tubular body attaching means, comprising projections extending outwardly from said mating surface, to engage corresponding apertures formed in said tubular body, for positively retaining said tubular body in engagement therewith prior to mating of said second clamping ring with said base member; and
- fixing means disposed between said base ring and said clamping ring, comprising dovetail projections disposed on one of said base ring and said clamping ring, for sliding engagement with corresponding slots on the other of said base ring and said clamping ring, for retaining said rings in mating engagement.

* * * * *